(12) United States Patent
Shima

(10) Patent No.: US 7,411,689 B1
(45) Date of Patent: Aug. 12, 2008

(54) PRINTER CAPABLE OF NETWORK CONNECTION AND METHOD FOR CONTROLLING SAID PRINTER

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/577,078

(22) Filed: May 23, 2000

(30) Foreign Application Priority Data

May 24, 1999 (JP) .................................. 11-142685
Mar. 8, 2000 (JP) .............................. 2000-063791

(51) Int. Cl.
*G06K 15/00* (2006.01)
*G06F 3/12* (2006.01)

(52) U.S. Cl. ...................................... 358/1.15; 358/402

(58) Field of Classification Search ................ 358/1.15, 358/1.14, 1.13, 1.16, 1.1, 1.9, 403, 1.11, 358/1.12, 402; 709/201, 203, 205, 219, 213–216; 715/700, 737–741, 753
See application file for complete search history.

(56) References Cited

U.S. PATENT DOCUMENTS

| 5,956,487 | A | 9/1999 | Venkatraman et al. | |
|---|---|---|---|---|
| 6,184,996 | B1 * | 2/2001 | Gase | 358/1.15 |
| 6,202,092 | B1 * | 3/2001 | Takimoto | 709/225 |
| 6,301,011 | B1 * | 10/2001 | Fung et al. | 358/1.15 |
| 6,337,745 | B1 * | 1/2002 | Aiello et al. | 358/1.15 |
| 6,351,317 | B1 * | 2/2002 | Sasaki et al. | 358/1.15 |
| 6,384,926 | B2 * | 5/2002 | Mochizuki | 358/1.15 |
| 6,429,952 | B1 | 8/2002 | Olbricht | |
| 6,452,692 | B1 * | 9/2002 | Yacoub | 358/1.15 |
| 6,453,127 | B2 * | 9/2002 | Wood et al. | 399/8 |
| 6,529,522 | B1 * | 3/2003 | Ito et al. | 370/466 |
| 6,567,176 | B1 * | 5/2003 | Jeyachandran et al. | 358/1.14 |
| 6,791,703 | B1 * | 9/2004 | Maeda et al. | 358/1.15 |

FOREIGN PATENT DOCUMENTS

| EP | 0 884 672 A2 | 12/1998 |
|---|---|---|
| EP | 0 886 206 A2 | 12/1998 |
| EP | 0 884 672 A3 | 4/2001 |
| JP | 9-238209 | 9/1997 |
| JP | 9-282119 | 10/1997 |
| JP | 10-164295 | 6/1998 |
| JP | 10-240552 | 9/1998 |
| JP | 11-126141 | 5/1999 |
| JP | 11-3192 | 6/1999 |

OTHER PUBLICATIONS

European Search Report, May 15, 2002, 3 pages.

(Continued)

*Primary Examiner*—Gabriel I. Garcia
(74) *Attorney, Agent, or Firm*—Osha Liang LLP

(57) ABSTRACT

This invention is composed as a printer which receives a print request from a computer, the print request including a request to a peripheral device to acquire print data, and sends the acquisition request to the peripheral device, and performs printing on the basis of the print data sent from the peripheral device in response to the acquisition request. Accordingly, the printer is capable of receiving the print data from the peripheral device instead of receiving the print data from the computer.

1 Claim, 10 Drawing Sheets

OTHER PUBLICATIONS

Notice of Reasons for Refusal dated Mar. 16, 2006 with English translation (4 pages).
Patent Abstracts of Japan; Publication No. 11-003192 dated Jun. 1, 1999 (2 pages).
English Translation of JP-11-003192 (24 pages).
Patent Abstracts of Japan; Publication No. 10-164295 dated Jun. 19, 1998 (2 pages).
English Translation of JP-10-164295 (24 pages).
Patent Abstracts of Japan; Publication No. 09-282119 dated Oct. 31, 1997 (2 pages).
English Translation of JP-9-282119 (18 pages).
Patent Abstracts of Japan; Publication No. 11-12141 dated May 11, 1999 (2 pages).
English Translation of JP-11-12141 (17 pages).
Patent Abstracts of Japan; Publication No. 09-238209 dated Sep. 9, 1997 (2 pages).
English Translation of JP-9-238209 (21 pages).
Patent Abstracts of Japan; Publication No. 10-240552 dated Sep. 11, 1998 (2 pages).
English Translation of JP-10-240552 (154 pages).
USPTO Office Action dated Jul. 28, 2006 for related U.S. Appl. No. 10/801,619 (11 pages).
Office Action for U.S. Appl. No. 10/801,619 mailed on Jan. 25, 2007 (8 pages).

* cited by examiner

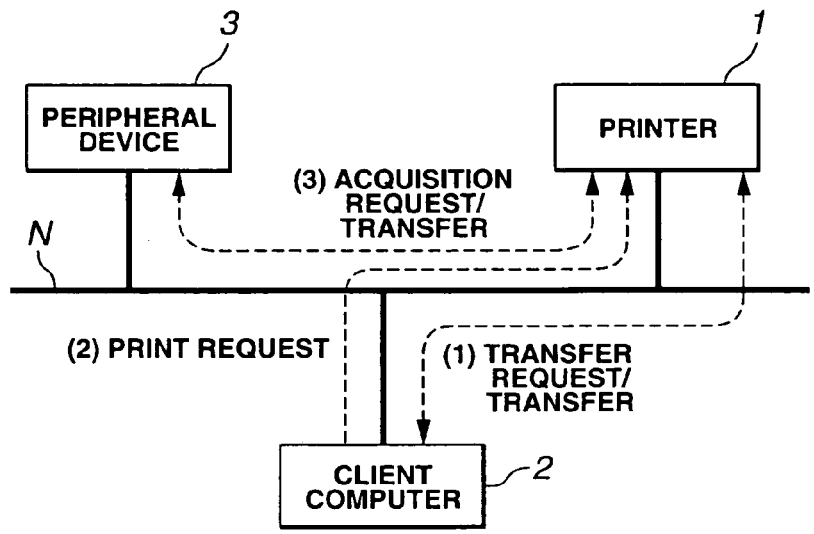
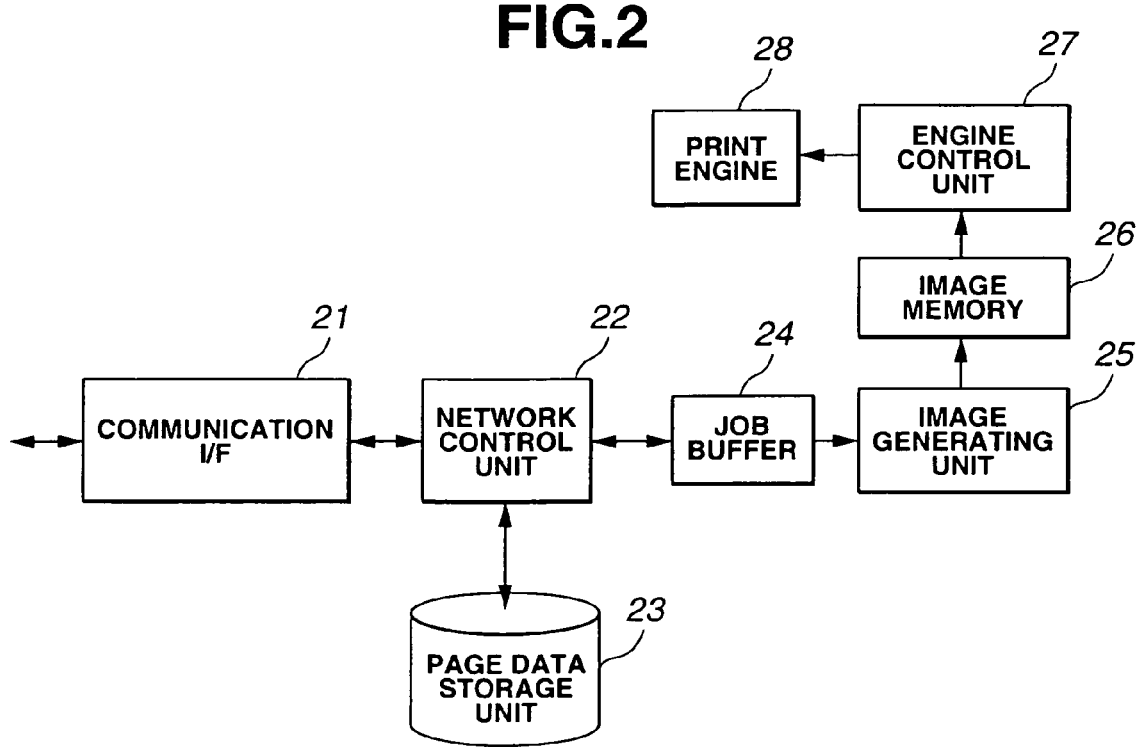

PRINTER CAPABLE OF NETWORK CONNECTION AND METHOD FOR CONTROLLING SAID PRINTER

BACKGROUND OF THE INVENTION

1. Field of the Invention

The present invention relates to the technology of printers applicable to networks. More particularly, this invention relates to the technology of printers capable of direct printing without fetching information resources existing at a certain node on a network and sending them into computers.

2. Description of the Related Art

A computer network system is composed of a network and many nodes interconnected through the network. Nodes mean, for example, computers, printers, and other equipment. Nodes connected to a network exchange information with each other by utilizing various communication services.

For example, with a system including a printer connected to a network such as LAN (Local Area Network), a computer sends a print request through the network to the printer and the printer performs printing on the basis of the print request.

With a WWW (World Wide Web) system, a client computer accesses server computers, that is, Web servers or Web sites in accordance with a URI (Uniform Resource Identifier) and acquires information resources such as Web pages. The client computer then displays the acquired information resource through a browser.

With the prior art, when a user attempts to print information resources existing at a certain node on a network, the user accesses the node from a computer to download the information resources and then sends a print request from the computer to the printer based on the information resources. In other words, the user cannot make the printer directly fetch the information resources existing at the node to enable printing. Moreover, since the information resources to be printed is sent from the node to the computer and then from the computer to the printer, heavier load than necessary is applied to the network.

SUMMARY OF THE INVENTION

It is an object of this invention to provide a printer which may adapt to a network environment. Specifically, it is an object of this invention to enable a printer to directly print the information resources existing at a certain node without having a computer fetch such information resources.

A first feature of this invention is that a printer receives a print request, which is sent from a computer and which includes a request to a peripheral device to acquire print data, and the printer then sends the acquisition request to the peripheral device and performs printing on the basis of the print data sent from the peripheral device in response to the acquisition request. Accordingly, the printer is capable of receiving the print data from the peripheral device instead of receiving the print data from the computer. The acquisition request should preferably include information (such as URI or URL) about the location of the peripheral device on a network.

In response to a given transfer request sent from the computer prior to the receipt of the print request, the printer sends page data, which composes a print acceptance screen to send the print request, to the computer. Examples of the page data are HTML and XML. The page data may include programs (scripts). Accordingly, the computer is capable of displaying the print acceptance screen on the basis of the page data and accepting the input made by users.

A second feature of this invention is that in response to a given transfer request sent from a computer, a printer sends, to the computer, page data which composes a print acceptance screen for the computer to request the printing of print data, and the computer sends to a peripheral device a print request including a request to acquire the print data on the basis of the print acceptance screen, the peripheral device then acquires and sends the print data in response to the print request, and the printer receives the print data and performs printing on the basis of the received print data.

A third feature of this invention is that a computer displays a print acceptance screen on the basis of page data sent from a given node, and the print acceptance screen comprises a first area for a user to specify a peripheral device to acquire print data, a second area for a user to specify a given condition when the peripheral device acquires the print data, and a third area for a user to specify a printer made to print on the basis of the print data, and the computer acquires the print data from the peripheral device specified in the first area in accordance with the given condition specified in the second area and sends an acquisition/print request for printing to the printer specified in the third area.

A fourth feature of this invention is that a computer displays a print acceptance screen on the basis of page data sent from a given node, and the print acceptance screen comprises a first area for a user to specify a peripheral device to acquire print data, a second area for a user to specify a given condition when the peripheral device acquires the print data, and a third area for a user to specify a printer made to print on the basis of the print data, and the computer sends an acquisition/print request to the peripheral device specified in the first area to cause the peripheral device to acquire the print data in accordance with the given condition specified in the second area and to send the acquired print data to the printer specified in the third area, thereby causing the printer to print.

BRIEF DESCRIPTION OF THE DRAWINGS

FIG. 1 is a diagram depicting a schematic structure of a print system according to Embodiment 1.

FIG. 2 is a block diagram depicting a functional structure of a printer according to Embodiment 1.

DESCRIPTION OF THE PREFERRED EMBODIMENTS

Figure 3:
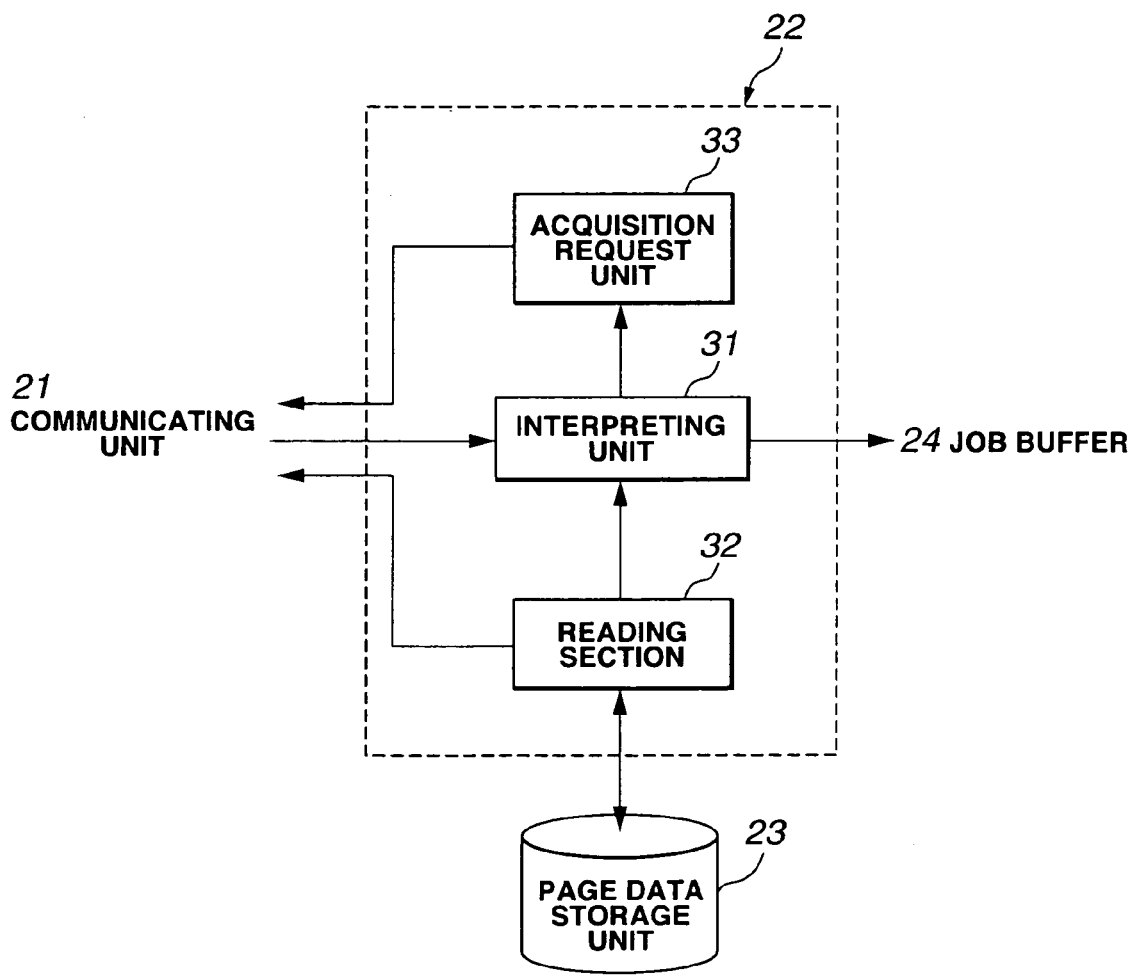
FIG. 3 is a block diagram depicting the details of a network control unit according to Embodiment 1.

Embodiments of this invention are hereinafter explained with reference to the attached drawings.

Embodiment 1

FIG. 1 is a diagram depicting a schematic structure of a print system according to Embodiment 1. Referring to FIG. 1, a printer 1 is connected through network N to a client computer 2 and a peripheral device 3. The printer 1 of Embodiment 1 has a so-called Web server function and, therefore, is capable of performing processing according to various requests based on HTTP (Hyper Text Transfer Protocol) sent from the client computer 2 and the like. The client computer 2 is typically a terminal unit operated by a user. Examples of the peripheral device 3 include a scanner and a digital camera, and the peripheral device 3 may be a file server. The peripheral device 3 performs its proper processing in response to a given request sent from the printer 1 and sends given data thereby obtained to the printer 1. For example, in the case of a scanner, it captures given images and sends the image data to the printer 1. In this case, the print system may be structured in a manner such that the printer 1 and the scanner conduct communications on the basis of specific network protocols, or such that communications are conducted based on the HTTP.

Embodiment 1 is characterized in that a user inputs given information, including information about the acquisition of the print data, according to a print acceptance screen (Web page) supplied from the printer 1, a print request including the given information is then sent to the printer 1, and the printer 1 which has received the printer request acquires the print data according to the given information and then performs printing. For example, assuming that a user is trying to make the printer 1 directly print the images captured by the scanner as the peripheral device 3, the client computer 2 sends a request to transfer the print acceptance screen to the printer 1 and then displays the print acceptance screen supplied from the printer 1 ((1) in FIG. 1). The user inputs, on the print acceptance screen, a directive to capture images by means of the scanner and the directive is then sent as a print request to the printer 1 ((2) in FIG. 1). When the printer 1 receives this print request, it gives the directive to the scanner to capture images and the scanner then sends the captured images to the printer 1 ((3) in FIG. 1). The printer 1 receives the images sent from the scanner and prints the images on a print record medium.

FIG. 2 is a block diagram depicting a functional structure of the printer according to Embodiment 1. As shown in FIG. 2, a communicating unit 21 performs processing to conduct communications between the client computer 2 and the peripheral device 3. Specifically speaking, the communicating unit 21 physically and logically converts data received through the network N and delivers the converted data to a network control unit 22. Moreover, the communicating unit 21 physically and logically converts data delivered from the network control unit 22 and sends the converted data onto the network N. If the communicating unit 21 is connected to, for example, a LAN, the communicating unit 21 is composed of, for example, a driver or the like corresponding to various hardware and various kinds of protocols such as TCP/IP.

The network control unit 22 interprets data sent through the communicating unit 21 and performs various processing on the basis of the results of interpretation. Specifically speaking, if the network control unit 22 receives a request to transfer Web pages, the network control unit 22 reads page data, which composes the Web pages specified by the transfer request, from a page data storage unit 23 and sends the page data to the communicating unit 21 so that such page data will be sent to the original requester. If another node (peripheral device 3) makes a request to acquire the print data, the network control unit 22 acquires the print data from the specified peripheral device and sends the acquired print data to a job buffer 24. Details of the network control unit 22 will be described later.

The page data storage unit 23 stores the page data to be supplied to the client computer 2. This page data composes a print acceptance screen by means of a browser on the client computer 2.

The job buffer 24 temporarily stores print data sent out through the network control unit 22. In order to enable the job buffer 24 to retain a plurality of the print data, the job buffer 24 should preferably be composed of auxiliary storages such as hard disks. The print data stored on the job buffer 24 is sequentially read out to an image generating unit 25.

The image generating unit 25 generates dot image data, which composes pixels in print images, on the basis of the print data stored on the job buffer 24 and expands (or writes) it in an image memory 26. The image generating unit 25 may be designed to convert the print data once into an intermediate code, expand it in a storage area (not shown in the drawing), and then expand it in the image memory 26.

The image memory 26 is typically composed of DRAM or SRAM and has storage capacity that can be adequately set according to a print speed of a print engine 28, a bandwidth of printing, and other factors.

An engine control unit 27 controls the print engine 28, reads the image data expanded in the image memory 26 and supplies the image data to the print engine 28. The print engine 28 carries out printing on a print record medium such as paper.

For example, in the case of a laser printer, the print engine 28 is composed of, for example, a laser illumination mechanism, a photosensitive drum, and a paper feed mechanism. The print engine 28 is selected as appropriate, for example, for monochrome printing or color printing, or as a high-speed type or a-low-speed type.

FIG. 3 is a block diagram showing details of the network control unit according to Embodiment 1. As shown in FIG. 3, the network control unit 22 includes an interpreting unit 31, a reading unit 32, and an acquisition request unit 33.

The interpreting unit 31 interprets data sent from the communicating unit 21 and performs processing according to the results of interpretation. Specifically speaking, if the interpreting unit 31 determines that the data sent from the communicating unit 21 is a request to transfer page data which composes a print acceptance screen, the interpreting unit 31 notifies the reading unit 32 of such effect. If the interpreting unit 31 determines that the data sent from the communicating unit 21 is a print request, including a request to the peripheral device 3 to acquire print data, the interpreting unit 31 notifies the acquisition request unit 33 of the acquisition request. Moreover, if the interpreting unit 31 determines that the received data is the print data sent from the peripheral device 3 in response to the acquisition request from the acquisition request unit 33, the interpreting unit 31 sends such data to the job buffer 24.

The reading unit 32 reads given page data from the page data storage unit 23 according to the results of interpretation by the interpreting unit 31 (the request to transfer page data) and sends the page data to the communicating unit 21. Consequently, the read page data will be eventually sent to the original requester (client computer 2).

The acquisition request unit 33 sends to the communicating unit 21 a request to acquire the print data from the peripheral device 3 according to the results of interpretation by the interpreting unit 31 (the acquisition request to the peripheral device 3). In this case, for example, if the acquirer of the print data is a scanner, the acquisition request should preferably include information (or parameters) about image capturing such as resolution and number of colors. Accordingly, the request to acquire the print data is sent to the peripheral device 3 as specified by the information about the location on the network, and the peripheral device 3 sends the print data to the printer 1. The print data sent from the peripheral device 3 in response to the acquisition request will be sent to the job buffer 24.

Figure 4:
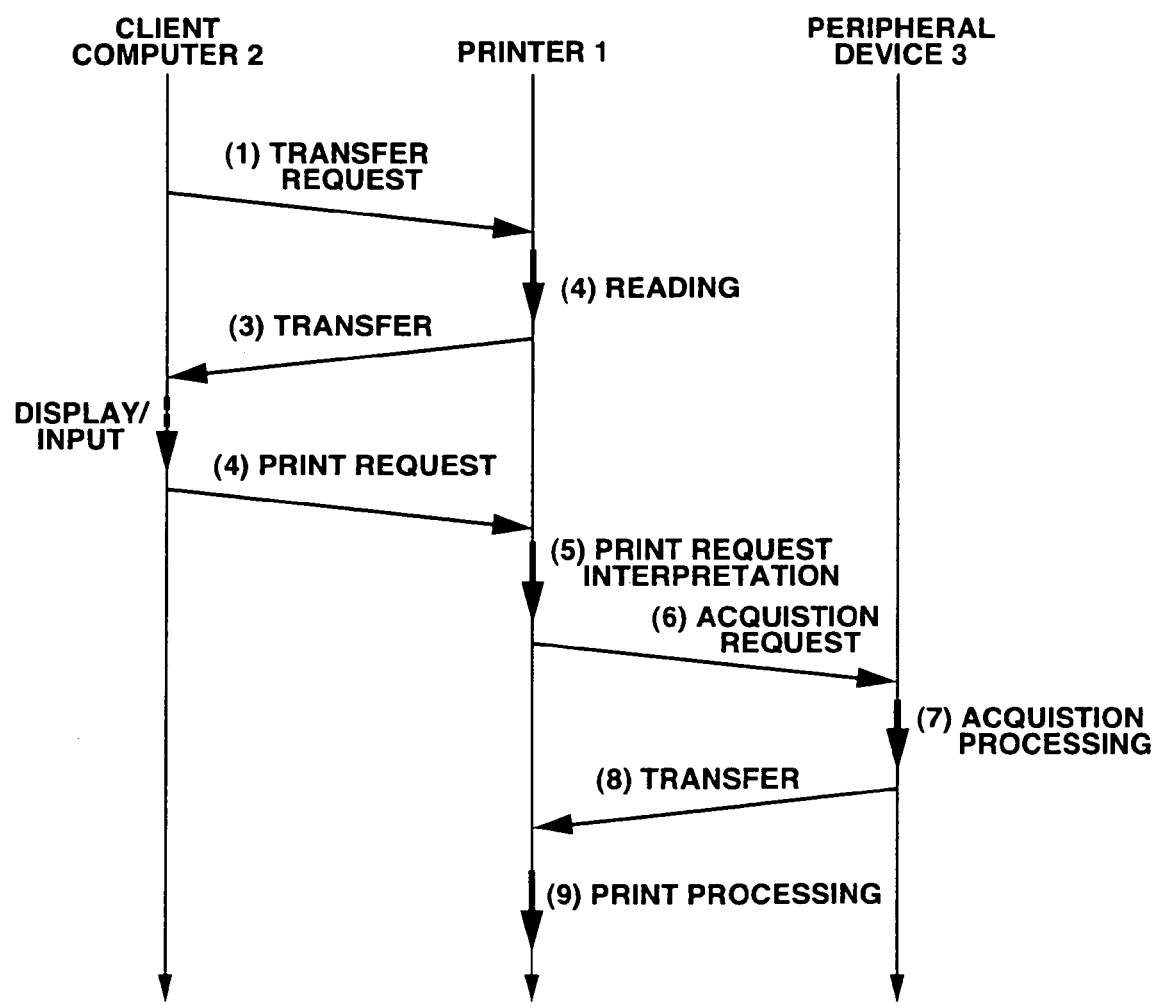
FIG. 4 is a sequence diagram which explains an example operation of the print system according to Embodiment 1.
Figure 5:
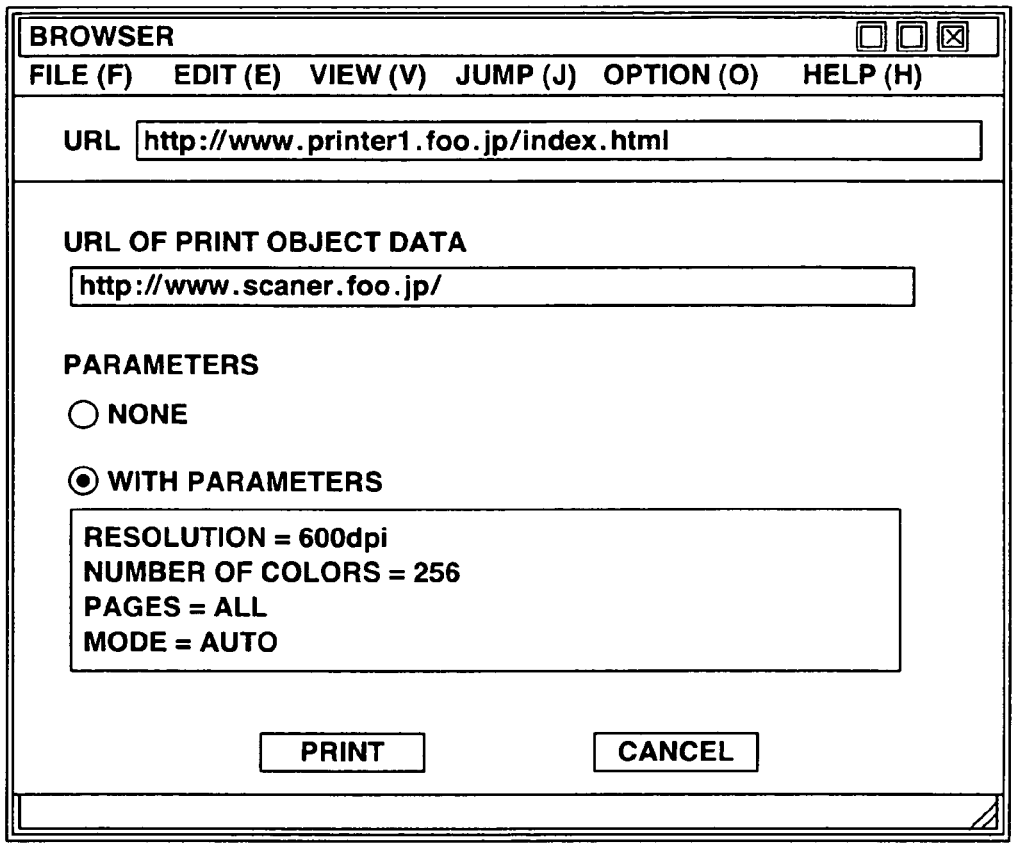
FIG. 5 is a diagram depicting an example of a print acceptance screen.

FIG. 4 is a sequence diagram which explains an example operation of the print system according to Embodiment 1. As shown in. FIG. 4, the client computer 2 requests the printer 1 to transfer the page data which composes the print acceptance screen ((1) in FIG. 4). Such a transfer request is realized, for example, when a user designates information about the location of the page data on the network by utilizing the browser. The printer 1 reads out given page data from the page data storage unit 23 on the basis of the transfer request sent from the client computer 2 ((2) in FIG. 4) and transfers the page data to the client computer 2 which is the original requester ((3) in FIG. 4). Accordingly, the print acceptance screen will be displayed through the browser of the client computer 2. FIG. 5 is a diagram illustrative of an example of the print acceptance screen. A user inputs given information on this print acceptance screen. In FIG. 5, a scanner on the network is designated as an acquirer of the print data and various parameters (control information) are also designated as conditions for the scanner to acquire the print data. When a user inputs necessary information on the print acceptance screen and selects the "PRINT" button (for example, with click operation), the client computer 2 sends a print request based on the input information to the printer 1 ((4) in FIG. 4). When the printer 1 accepts the print request sent from the client computer 2, it interprets the print request ((5) in FIG. 4) and sends an acquisition request to the peripheral device 3 indicated by URL of the print data (6) in FIG. 4). When the peripheral device 3 accepts the acquisition request sent from the printer 1, it acquires the print data by performing its proper processing in accordance with the conditions (parameters) necessary for the acquisition ((7) in FIG. 4) and sends the print data to the printer 1 ((8) in FIG. 4). If the peripheral device 3 is, for example, a scanner, it reads a manuscript and converts it into a given data format and sends the converted data to the printer 1. Subsequently, when the printer 1 receives the print data in response to the acquisition request, the printer 1 generates image data based on the print data and supplies the image data to the print engine 28, thereby performing printing ((9) in FIG. 4).

In the above-described case, the client computer 2 may make a request to transfer information about a print preview screen to the peripheral device 3.

As stated above, according to Embodiment 1, the client computer 2 is capable of causing the printer 1 to print the print data existing at the peripheral device 3 on the network through the print acceptance screen provided by the printer 1. Accordingly, the print data existing at the peripheral device 3 is not transferred to the client computer 2 once, but is transferred directly to the printer 1. Therefore, it is possible to lighten the load on the client computer 2 and the network.

Embodiment 2

Figure 6:
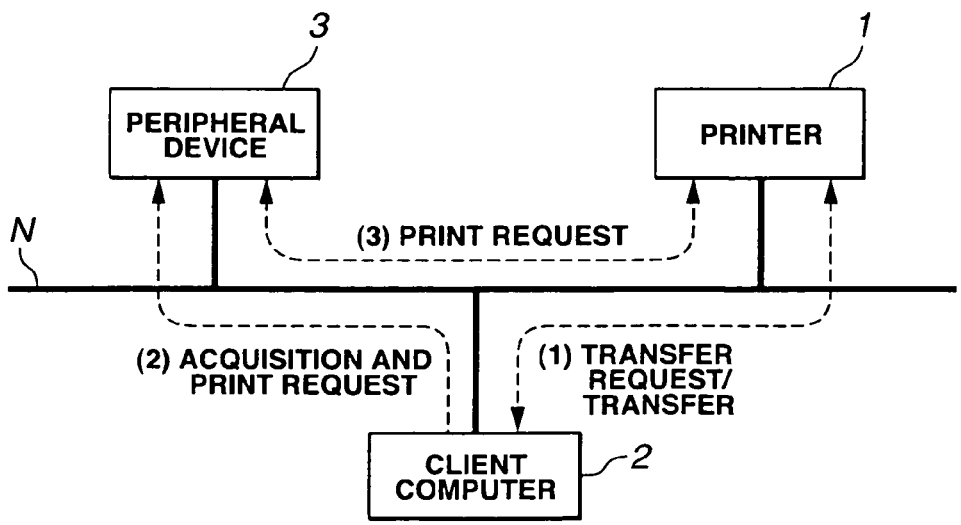
FIG. 6 is a diagram depicting a schematic structure of a print system according to Embodiment 2.

FIG. 6 is a diagram depicting a schematic structure of a print system according to Embodiment 2. Embodiment 2 is characterized in that a user gives a print directive by inputting given information, including information about the acquisition of the print data, according to a print acceptance screen supplied from a printer 1, a client computer 2 requests a peripheral device 3 according to the given information to send the print data together with a print request to the printer 1, and the printer 1 which has received them prints the print data. For example, assuming that a user is trying to make the printer 1 directly print the images captured by a scanner as the peripheral device 3, the client computer 2 sends a request to transfer the print acceptance screen to the printer 1 and then displays the print acceptance screen supplied from the printer 1 ((1) in FIG. 6). The user inputs, on the print acceptance screen, a directive to capture images by means of the scanner and the directive is then sent together with a print request to the scanner ((2) in FIG. 6). When the scanner captures the images according to the image capture directive, it sends out the captured images and the print request to the printer 1 ((3) in FIG. 6). Subsequently, the printer 1 prints the images sent from the scanner.

Figure 7:
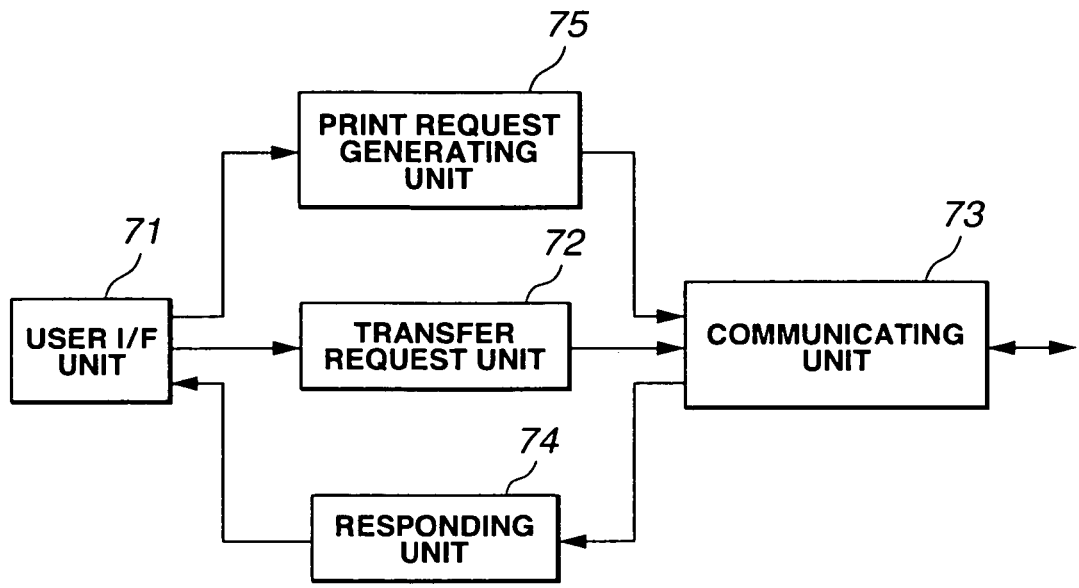
FIG. 7 is a block diagram depicting a functional structure of a client computer according to Embodiment 2.

FIG. 7 is a block diagram depicting a functional structure of a browser on the client computer 2 according to Embodiment 2. The browser of Embodiment 2 has a function to access Web servers and also a function to determine where to connect on the basis of information inputted on the print acceptance screen. Such functions are implemented, for example, as the printer 1 transfers programs (scripts) together with page data and an interpreter incorporated into the browser interprets and executes the programs.

Referring to FIG. 7, a user interface unit (hereinafter referred to as the "user I/F unit") 71 presents a browser screen to a user and realizes a function for the user to input given information on the basis of the browser screen. A transfer request unit 72 sends a transfer-request to a communicating unit 73 in order to request a transfer of page data to a given node (the printer 1 in this example) on the network. The given node is represented by, for example, URL and is specified in a given input field on the browser screen presented by the user I/F unit 71. The communicating unit 73 sends the transfer request from the transfer request unit 72 onto the network and receives data which has been sent to it and sends the data to a responding unit 74. The communicating unit 73 corresponds to the communicating unit 21 of the printer 1 as described above. The responding unit 74 sends the data sent from the communicating unit 73 to the user I/F unit 71. Accordingly, the user I/F unit 71 displays a screen which is composed on the basis of the page data transferred from the node designated by the user. In Embodiment 2, the printer 1 is designated as the node and the print acceptance screen is displayed on the basis of the page data, including programs, transferred from the printer 1. A print request unit 75 generates a print request on the basis of given information inputted by the user on the print acceptance screen. Specifically speaking, when the print request unit 75 accepts the given information through the print acceptance screen, it generates the print request including an acquisition request to an acquirer of the print data and sends it to the communicating unit 73 so that the communicating unit 73 will further send the print request. The print request herein used is a request to cause the printer 1 to print the acquired print data. The communicating unit 73 which has received the print request from the print request generating unit 75 sends the print request to the acquirer of the print data.

Figure 8:
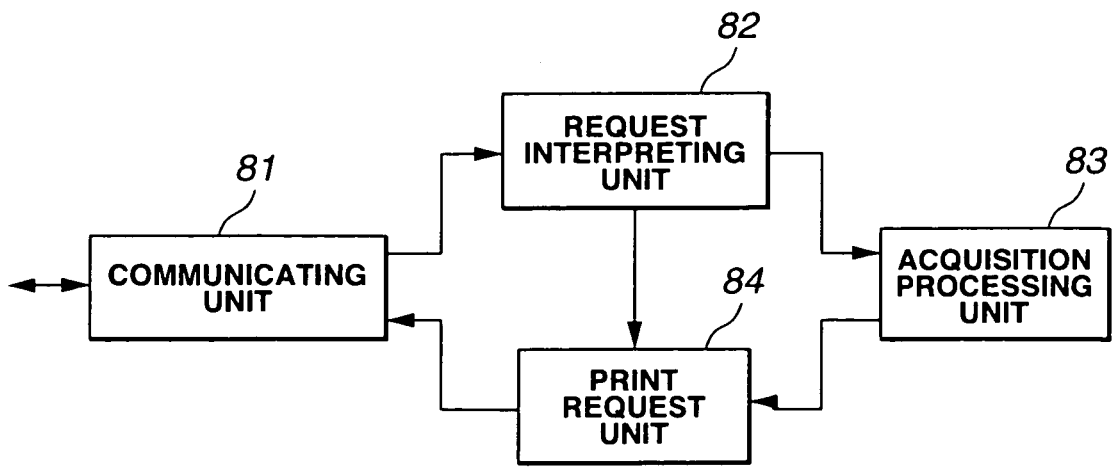
FIG. 8 is a block diagram depicting a functional structure of a peripheral device according to Embodiment 2.

FIG. 8 is a block diagram depicting a functional structure of the peripheral device 3 according to Embodiment 2. As shown in FIG. 8, the peripheral device 3 has a communicating unit 81, a request interpreting unit 82, an acquisition processing unit 83, and a print request unit 84.

The communicating unit 81 receives data sent from the client computer 2 and sends the data to the request interpreting unit 82, and also sends the print request sent from the print request unit 84 onto the network N so that the print request will be sent to the printer 1. The request interpreting unit 82 interprets the print request sent from the client computer 2 through the network N, sends the acquisition request for the print data, which is included in the print request, to the acquisition processing unit 83, and sends to the print request unit 84 the print request to the printer 1. The acquisition processing unit 83 performs processing to acquire the print data indicated by the acquisition request. If the peripheral device 3 is, for example, a scanner, the scanner reads a manuscript placed on a manuscript plate and converts it into a given data format and sends the data to the print request unit 84. If the peripheral device 3 is a file server, the file server reads a file from the directory designated by the acquisition request and sends the file to the print request unit 84. The print request unit 84 generates the print request to make the printer 1 print on the basis of the print data sent from the acquisition processing unit 83 and sends the print request to the communicating unit 81. In other words, when the peripheral device 3 receives the print request, including the acquisition request, from the client computer 2, it acquires the print data in response to the acquisition request and then sends to the printer 1 the print request to cause the printer 1 to print the print data.

Figure 9:
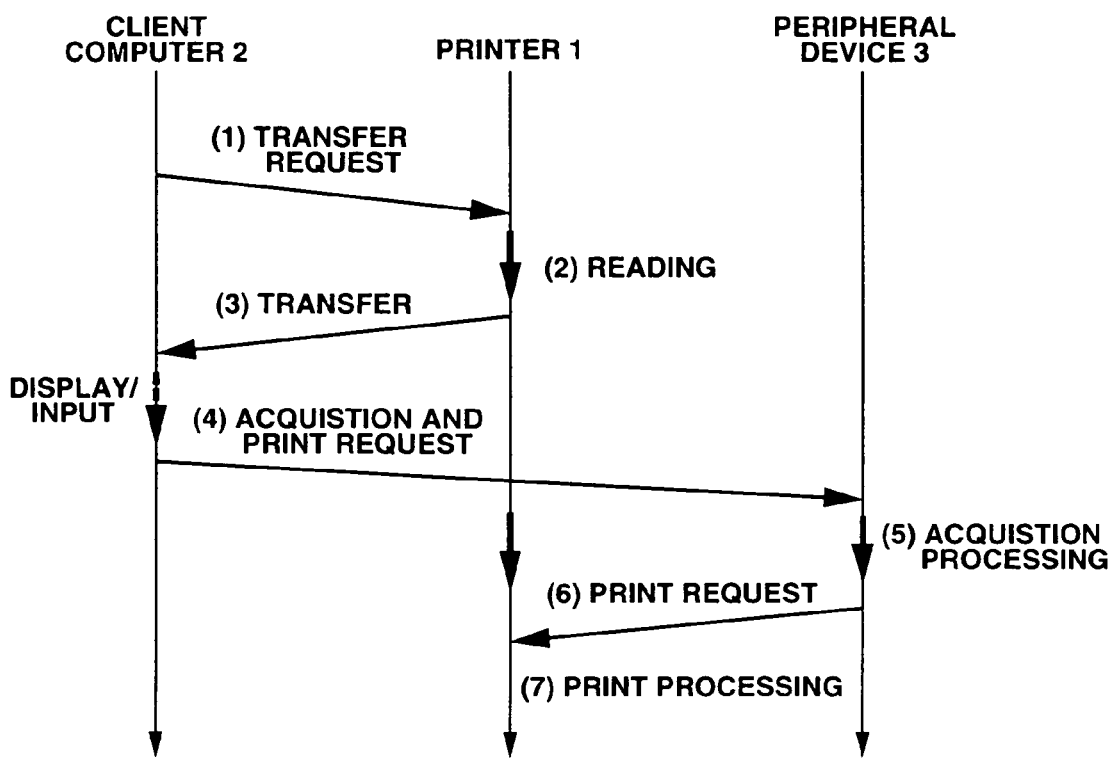
FIG. 9 is a sequence diagram which explains an example operation of the print system according to Embodiment 2.

FIG. 9 is a diagram which explains an example operation of the print system according to Embodiment 2. As shown in FIG. 9, the client computer 2 requests the printer 1 to transfer the page data which composes the print acceptance screen ((1) in FIG. 9). Such a transfer request is realized, for example, when a user designates information about the location of the page data on the network by utilizing the browser. The printer 1 reads out desired page data from the page data storage unit 23 on the basis of the transfer request sent from the client computer 2 ((2) in FIG. 9) and transfers the page data to the client computer 2 which is the original requester ((3) in FIG. 9). Accordingly, as shown in FIG. 5, the print acceptance screen will be displayed on the browser of the client computer 2. When a user inputs necessary information on the print acceptance screen and selects the "PRINT" button (for example, with click operation), the client computer 2 sends a print request based on the input information to the peripheral device 3 ((4) in FIG. 9). When the "PRINT" button is selected, the browser issues the print request by designating the peripheral device 3 indicated in the section of "URL of Print data" as a new connecting counterpart (or a receiver) so that the print data acquired by the peripheral device 3 will be sent to the printer 1, the present connecting counterpart. When the peripheral device 3 receives the print request sent from the printer 1, the peripheral device 3 performs its proper processing on the basis of the acquisition request included in the print request, thereby acquiring the print data ((5) in FIG. 9). The peripheral device 3 sends the print request to the printer 1 to cause the printer 1 to print the print data ((6) in FIG. 9). If the peripheral device 3 is, for example, a scanner, it reads a manuscript and converts it into a given data format and sends the converted data to the printer 1. Subsequently, receiving the print data, the printer 1 generates image data based on the print data and supplies the image data to the print engine 28, thereby performing printing ((7) in FIG. 9).

As stated above, according to Embodiment 2, the client computer 2 is capable of causing the printer 1 to print the print data existing at the peripheral device 3 on the network through the print acceptance screen provided by the printer 1. Specifically, according to Embodiment 2, the print request together with the request to acquire the print data are sent to the peripheral device 3, and after the peripheral device 3 acquires the print data in response to the acquisition request, the print request is sent to the printer 1. Accordingly, the print data existing at the peripheral device 3 is not transferred to the client computer 2 once, but is transferred directly to the printer 1. Therefore, it is possible to lighten the load on the client computer 2 and the network.

Embodiment 3

Figure 10:
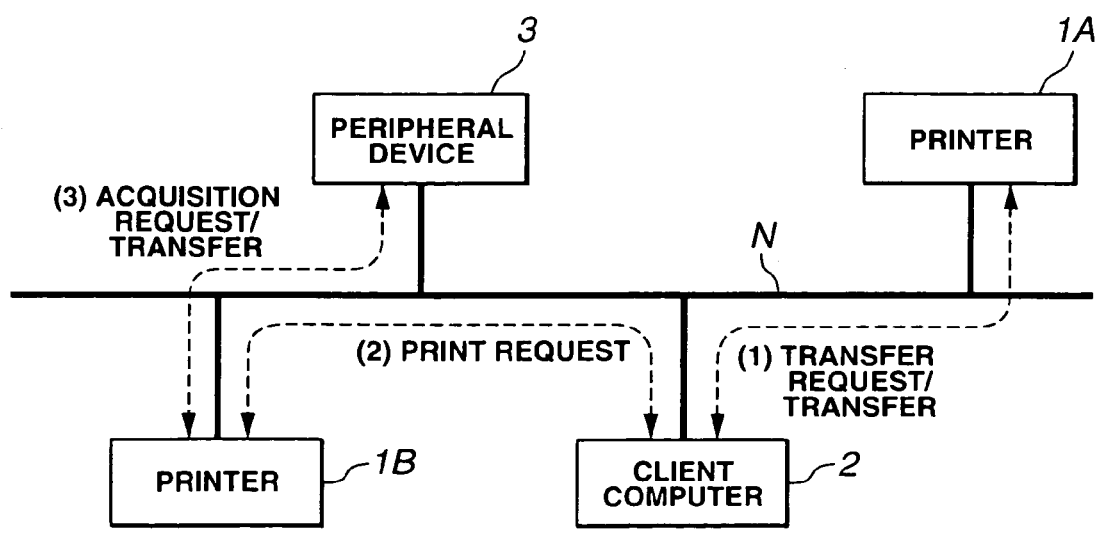
FIG. 10 is a schematic structure of a client computer according to Embodiment 3.

FIG. 10 is a diagram depicting a schematic structure of a print system according to Embodiment 3. Embodiment 3 is a variation of Embodiment 1 and is characterized in that a node, including a printer, on a network other than a printer to perform printing sends a print acceptance screen. This is particularly effective when a printer 1B does not have a function to provide the print acceptance screen. For example, assuming that a user is trying to make the printer 1B print the images captured by a scanner as a peripheral device 3, a client computer 2 sends a request to transfer the print acceptance screen to a printer 1A and then displays the print acceptance screen supplied from the printer 1A ((1) in FIG. 10). The user inputs, on the print acceptance screen, a directive to capture images by means of the scanner and designates the printer 1B as a place to print. The client computer 2 sends a print request, including an acquisition request, not only to the printer 1A which sends the print acceptance screen, but also to the printer 1B designated as the place to print ((2) in FIG. 10). When the printer 1A receives this print request, it gives the directive to capture images to the scanner and the scanner then sends the captured images to the printer 1B ((3) in FIG. 10). The printer 1B receives the images sent from the scanner and prints the images on a print record medium.

Figure 11:
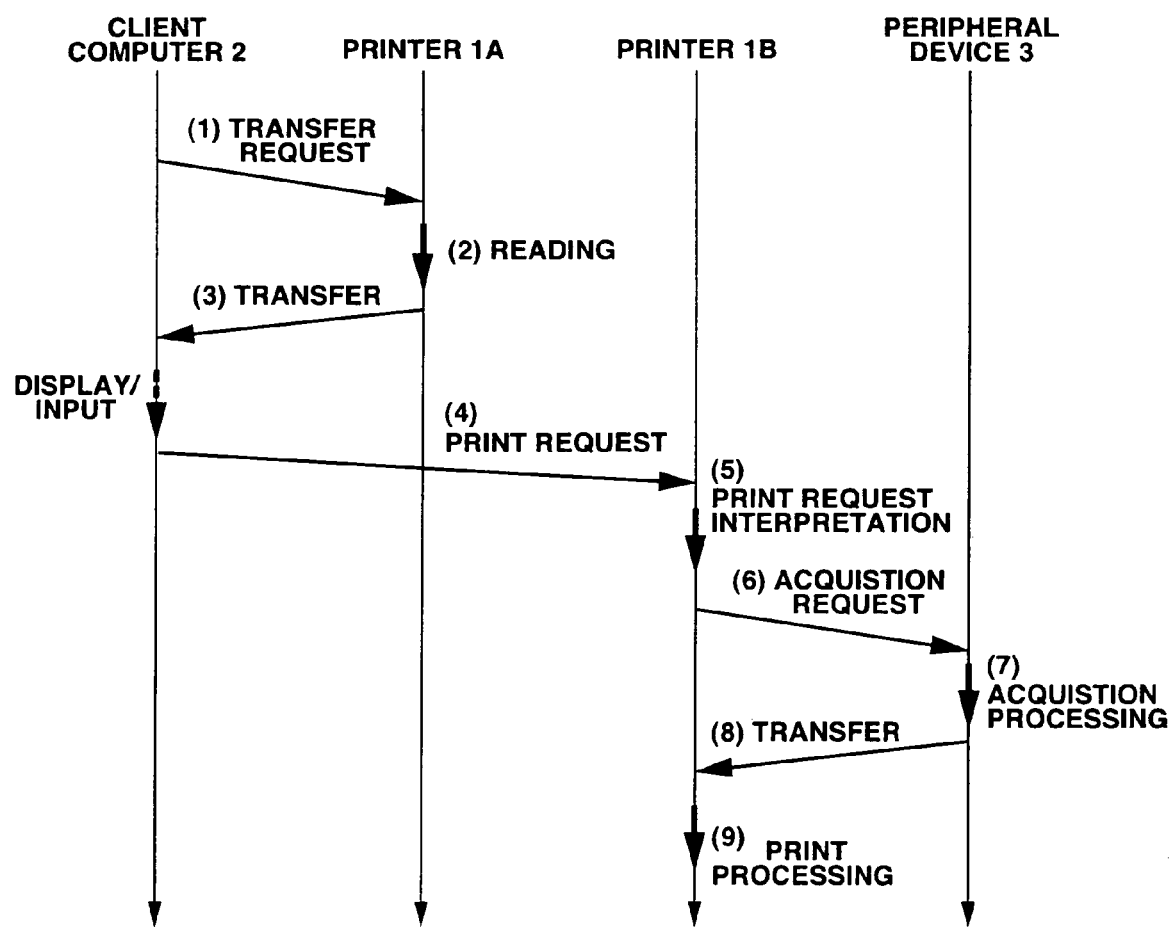
FIG. 11 is a sequence diagram which explains an example operation of a print system according to Embodiment 3.

FIG. 11 is a sequence diagram which explains an example operation of the print system according to Embodiment 3. As shown in FIG. 11, the client computer 2 first requests the printer 1A to transfer the page data which composes the print acceptance screen ((1) in FIG. 11). Such a transfer request is realized, for example, when a user designates information about the location of the page data on the network by utilizing the browser. The printer 1A reads out the given page data from the page data storage unit 23 on the basis of the transfer request sent from the client computer 2 ((2) in FIG. 11) and transfers the page data to the client computer 2 which is the original requester ((3) in FIG. 11). Accordingly, the print acceptance screen will be displayed on the browser of the client computer 2.

Figure 12:
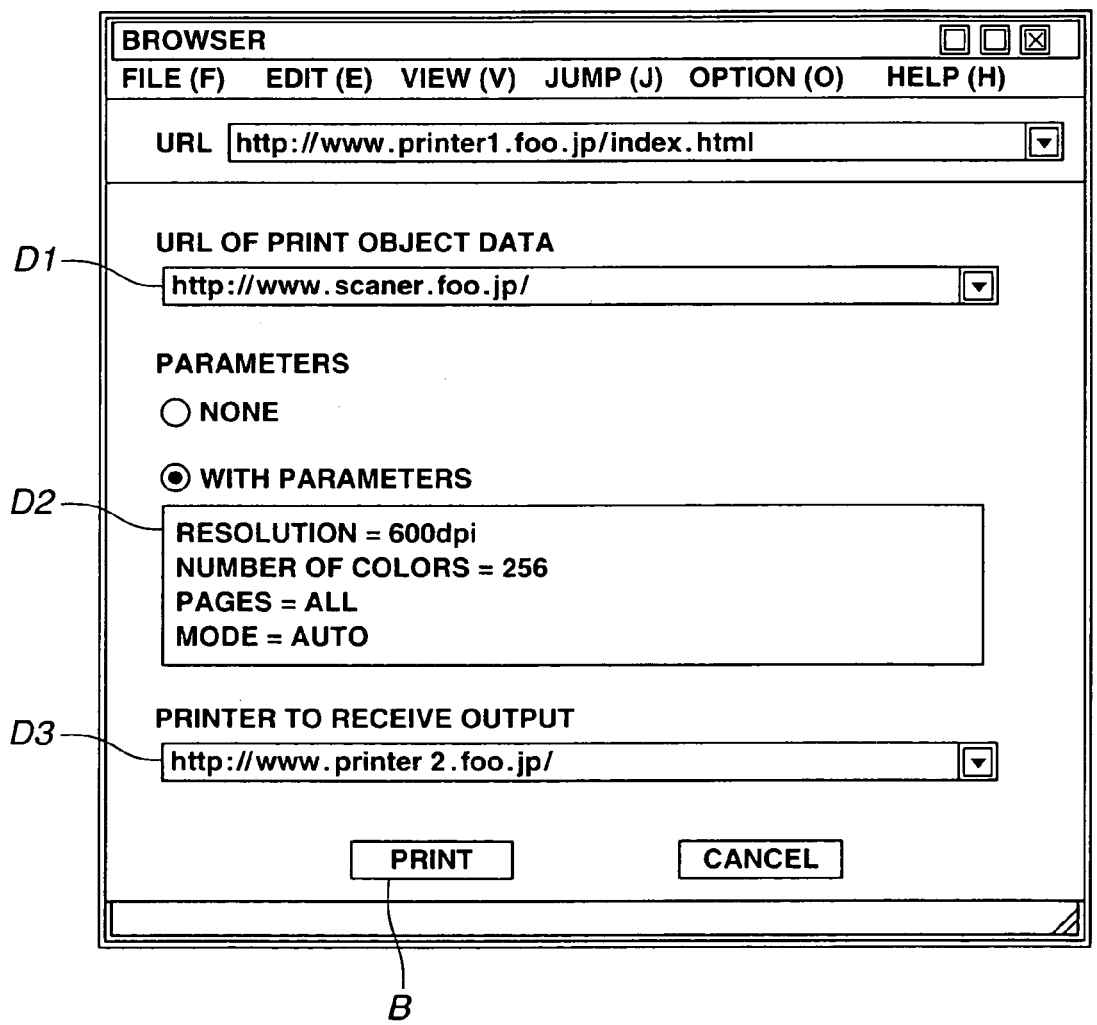
FIG. 12 is a diagram depicting an example of a print acceptance screen.

FIG. 12 is a diagram illustrative of an example of the print acceptance screen. As shown in FIG. 12, the print acceptance screen has: a print data specifying area D1 for specifying the location of a node with the print data existing thereat on the network; a parameter specifying area D2 for specifying given conditions to be imposed on the node where the print data exists; a print place specifying area D3 for specifying a printer to print the print data; and a print button B for giving a print executive instruction. The initial value in the print place specifying area D3 may be set as the printer 1A which has sent this print acceptance screen. If a user wants to make the printer 1B to print, the location of the printer 1B on the network will be specified instead of the printer 1A. The user inputs given information on this print acceptance screen. In FIG. 12, a scanner on the network is specified as an acquirer of the print data and various parameters (control information) are specified as conditions for the scanner to acquire the print data. Moreover, in FIG. 12, the printer 1B is specified as the print place.

When a user inputs necessary information on the print acceptance screen and selects the "PRINT" button (for example, with click operation), the client computer 2 sends a print request based on the input information to the printer 1B ((4) in FIG. 11). When the printer 1B accepts the print request sent from the client computer 2, it interprets the print request ((5) in FIG. 11) and sends an acquisition request to the peripheral device 3 indicated by URL of the print data (6) in FIG. 11). When the peripheral device 3 accepts the acquisition request sent from the printer 1B, it acquires the print data by performing its proper processing in accordance with the conditions (parameters) necessary for the acquisition ((7) in FIG. 11) and sends the print data back to the printer 1B ((8) in FIG. 11). Subsequently, when the printer 1B receives the print data in response to the acquisition request, the printer 1B generates image data based on the print data and supplies the image data to the print engine 28, thereby performing printing ((9) in FIG. 11).

As stated above, according to Embodiment 3, it is possible to achieve advantageous effects similar to those of Embodiment 1. Specifically, even if the printer which is intended to perform printing does not have a function to provide the print acceptance screen, the print system according to Embodiment 3 can operate as long as another node having such a function exists on the network.

Embodiment 4

Figure 13:
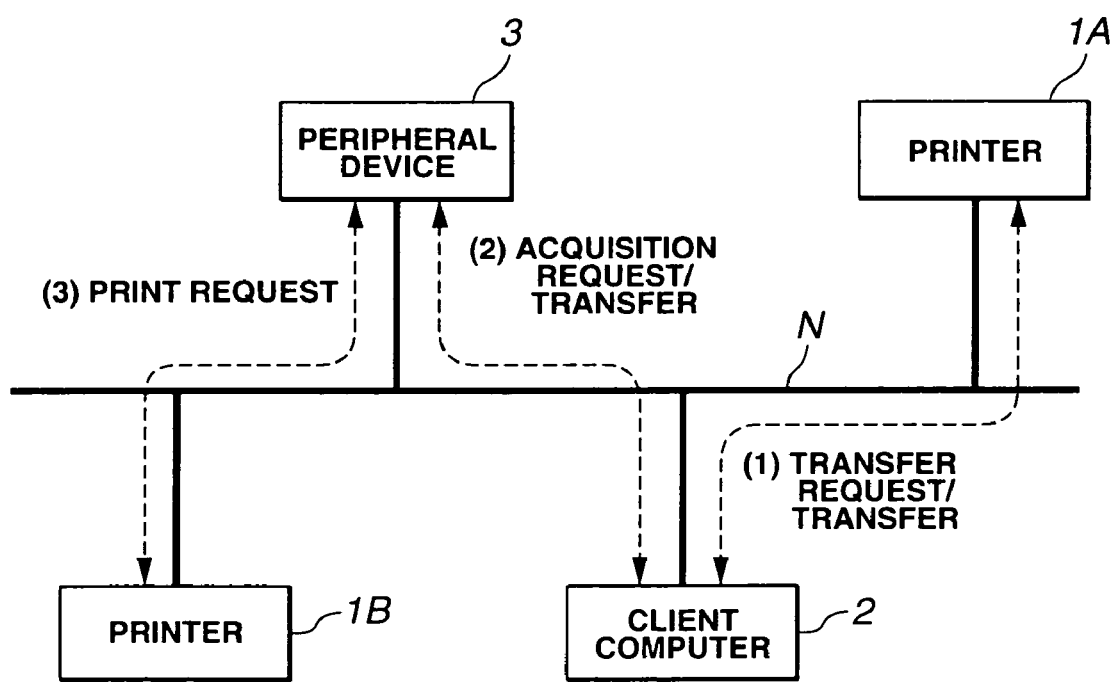
FIG. 13 is a diagram depicting a schematic structure of a client computer according to Embodiment 4.

FIG. 13 is a diagram depicting a schematic structure of a print system according to Embodiment 4. Embodiment 4 is a variation of Embodiment 2 and is characterized in that a node, including a printer, on a network other than a printer to perform printing sends a print acceptance screen. This is particularly effective when a printer 1B does not have a function to provide the print acceptance screen. For example, assuming that a user is trying to make a scanner as a peripheral device 3 capture images and to make the printer 1B print the images captured by the scanner, a client computer 2 sends a request to transfer the print acceptance screen to a printer 1A and then displays the print acceptance screen supplied from the printer 1A ((1) in FIG. 13). The user inputs, on the print acceptance screen, a directive to capture images by means of the scanner and designates the printer 1B as a place to print. The client computer 2 sends a print request, including an acquisition request, to the scanner ((2) in FIG. 13). When the scanner captures images in accordance with the image capture directive and then sends the captured images together with the print request to the printer 1B ((3) in FIG. 13). The printer 1B receives the images sent from the scanner and prints the images on a print record medium.

Figure 14:
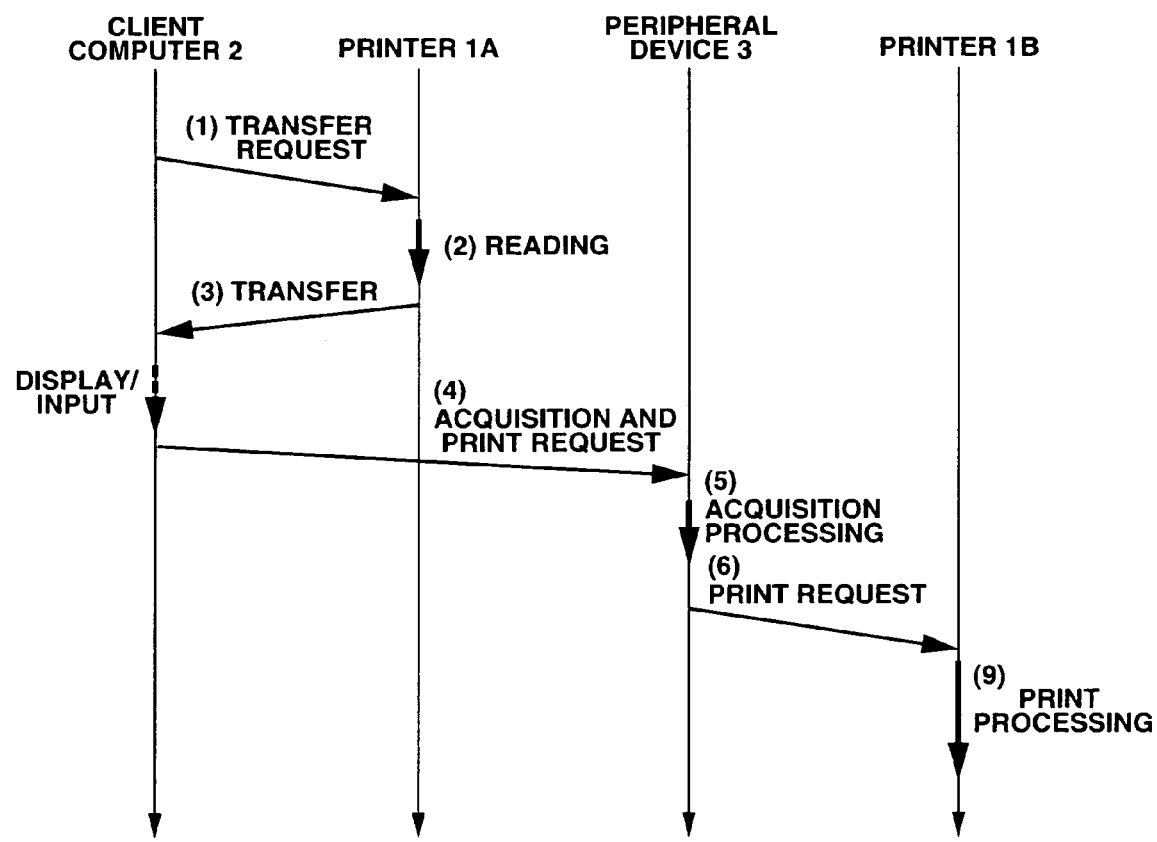
FIG. 14 is a sequence diagram which explains an example operation of a print system according to Embodiment 4.

FIG. 14 is a diagram which explains an example operation of the print system according to Embodiment 4. As shown in FIG. 14, the client computer 2 first requests the printer 1A to transfer the page data which composes the print acceptance screen ((1) in FIG. 14). Such a transfer request is realized, for example, when a user designates information about the location of the page data on the network by utilizing the browser. The printer 1B reads out given page data from the page data storage unit 23 on the basis of the transfer request sent from the client computer 2 ((2) in FIG. 14) and transfers the page data to the client computer 2 which is the original requester ((3) in FIG. 14). Accordingly, the print acceptance screen as shown in FIG. 12 will be displayed on the browser of the client computer 2.

When a user inputs necessary information on the print acceptance screen and selects the "PRINT" button (for example, with click operation), the client computer 2 sends a print request based on the input information to the peripheral device 3 ((4) in FIG. 14). Namely, when the "PRINT" button is selected, the browser issues the print request by designating the peripheral device 3 indicated in the section of "URL of Print data" as a new connecting counterpart (or a receiver) so that the print data acquired by the peripheral device 3 will be sent to the printer 1B, the place to print. When the peripheral device 3 receives the print request sent from the client computer 2, the peripheral device 3 performs its proper processing on the basis of the acquisition request included in the print request, thereby acquiring the print data ((5) in FIG. 14). The peripheral device 3 sends the print request to the printer 1B in order to cause the printer 1B designated as the print place to print the print data ((6) in FIG. 14). Subsequently, receiving the print data, the printer 1B generates image data based on the print data and supplies the image data, thereby performing printing ((7) in FIG. 14).

As stated above, according to Embodiment 4, the client computer 2 is capable of causing the printer 1 to print the print data existing at the peripheral device 3 on the network through the print acceptance screen provided by the printer 1. Specifically, according to Embodiment 4, the print request together with the acquisition request for the print data are sent to the peripheral device 3, and after the peripheral device 3 acquires the print data on the basis of the acquisition request, the print request is sent to the printer 1. Accordingly, the print data existing at the peripheral device 3 is not transferred to the client computer 2 once, but is transferred directly to the printer 1. Therefore, it is possible to lighten the load on the client computer 2 and the network.

As stated above, according to Embodiment 4, it is possible to achieve advantageous effects similar to those of Embodiment 2. Specifically, even if the printer which is intended to perform printing does not have a function to provide the print acceptance screen, the print system according to Embodiment 4 can operate as long as another node having such a function exists on the network.

The present invention can be implemented also as a recording medium or program product with programs stored thereon. Examples of the recording medium includes not only hard disks (HD), DVD-RAM, flexible disks (FD), CD-ROM and the like, but also memories such as RAM and ROM and communication media such as networks. Moreover, examples of the control unit of the printer includes so-called microcomputers of which central processing unit such as CPU or MPU performs specified processing by interpreting programs.

What is claimed is:

1. A system comprising:
   a first printer configured to provide a print acceptance screen to a client computer;
   the client computer configured to send a new print request directly to a second printer using the print acceptance screen provided by the first printer, wherein the new print request specifies a peripheral device on which data to print is stored; and
   the second printer configured to request the data to print from the peripheral device and print the data upon receipt from the peripheral device.

* * * * *